United States Patent [19]

Hodges et al.

[11] Patent Number: 5,541,977
[45] Date of Patent: *Jul. 30, 1996

[54] METHOD AND APPARATUS FOR PREVENTING WIRELESS FRAUD

[75] Inventors: Steven J. Hodges, Bethlehem Township, Hunterdon County; Zev C. Rubenstein, Elizabeth, Union County, both of N.J.

[73] Assignee: AT&T Corp., Murray Hill, N.J.

[*] Notice: The term of this patent shall not extend beyond the expiration date of Pat. No. 5,420,908.

[21] Appl. No.: 440,183

[22] Filed: May 12, 1995

Related U.S. Application Data

[63] Continuation of Ser. No. 30,682, Mar. 11, 1993, Pat. No. 5,420,908.

[51] Int. Cl.⁶ ............................... H04Q 7/38
[52] U.S. Cl. ............... 379/58; 379/59; 380/23
[58] Field of Search ............... 379/58, 59, 62; 340/825.3, 825.34, 825.5; 380/23

[56] References Cited

U.S. PATENT DOCUMENTS

| | | | |
|---|---|---|---|
| 4,525,712 | 6/1985 | Okano et al. | 340/825.31 |
| 5,150,412 | 9/1992 | Maru | 380/43 |
| 5,204,902 | 4/1993 | Reeds, III et al. | 380/23 |
| 5,210,787 | 5/1993 | Hayes et al. | 379/60 |
| 5,237,612 | 8/1993 | Raith | 380/23 |
| 5,239,294 | 8/1993 | Flanders et al. | 340/825 |
| 5,251,249 | 10/1993 | Allen et al. | 379/59 |
| 5,282,250 | 1/1994 | Dent et al. | 380/23 |

OTHER PUBLICATIONS

A. Athanasopulos and N. Risidore, "Service Control Point (SCP) For the GSM and Personal Communications Systems" *Third IEE Conference on Telecommunications*, 1991.

*Primary Examiner*—Dwayne D. Bost
*Attorney, Agent, or Firm*—Eugene J. Rosenthal

[57] ABSTRACT

The use of stolen mobile identification number (MIN) and electronic serial number (ESN) information to fraudulently place wireless calls is prevented by having the switches of multiple wireless carriers forward or direct, over a telephone connection, all calls placed from selected MINs to a central authentication platform that serves the multiple wireless carriers. The central authentication platform engages in a so-called "challenge-response" authentication with local processors that are interfaced to the wireless telephones from which non-fraudulent calls originate. The challenge-response authentication uses a shared secret key (S-Key) that is not broadcast over the interface, thus preventing the key from being "stolen". A call from a wireless telephone that is not interfaced to a local processor capable of successfully completing the challenge-response authentication is blocked, while a call from a wireless telephone having a local processor capable of successfully completing the challenge-response authentication is completed to the number desired by the customer. Advantageously, since the central authentication platform serves multiple wireless carriers, the need for one wireless carrier to access the database of another is alleviated and the expense of providing additional security is reduced.

15 Claims, 4 Drawing Sheets

| MIN | S-KEY | BLOCK |
|---|---|---|
| 908-419-3456 | 12345678 | NO |
| 212-315-8746 | 89753468 | YES |
| 333-444-4567 | 98877676 | NO |

5,541,977

METHOD AND APPARATUS FOR PREVENTING WIRELESS FRAUD

This is a continuation of application Ser. No. 08/030,682, filed Mar. 11, 1993, now U.S. Pat. No. 5,420,908.

TECHNICAL FIELD

This invention relates to the prevention of fraud for telephone calls originating from wireless telephones.

BACKGROUND OF THE INVENTION

As is well known, wireless telephones are identified by two pieces of information: the mobile identification number (MIN) and the electronic serial number (ESN). This information may be obtained and placed in another wireless telephone for the illicit purpose of making calls that will be billed to the person to whom the MIN and ESN were legitimately assigned. The MIN and ESN information is easily obtained because it is broadcast over the "air interface" between the wireless telephone and a wireless carrier's mobile switching center (MSC), and is, therefore, subject to capture via specialized scanning equipment that is readily available to thieves. This type of theft of services (known as "cloning") both inconveniences the customer and results in losses to the wireless carrier.

One prior art proposed solution is to monitor the calling patterns for all wireless calls, on a per customer basis, and to block any calls that do not correspond to the customer's prior calling pattern. This solution suffers from the problems that 1) it may result in the blocking of calls for an authorized customer if they change their calling pattern, 2) it will not successfully block calls from phones that continually change the MIN-ESN that they use (so-called "tumbler-cloner" or "magic phones"), and 3) typically the calling pattern can only be checked after the call is completed, at which time it is too late to prevent the fraud.

Another proposed prior art solution is to utilize the IS 54 B Cellular System Dual-Mode Mobile Station—Base Station Compatibility Standard (Rev-B). The IS 54 B standard calls for pre-call authentication of the calling wireless telephone using a "shared secret key" over a digital call set-up channel. A shared secret key is a key that is known only by the two parties involved in the authentication. However, this proposed solution suffers from the problems that in order to be operative it requires both 1) cooperation and investment on the part of all the wireless carriers, in particular a) the ability to access each other's data bases where the keys are stored and b) upgrading of their switching equipment to be compatible with the IS 54 B call setup standard; and 2) upgrading of the 10 million wireless telephones that are already in existence to handle call setup according to the IS 54 B standard. These propositions are both expensive and not likely to happen in a short time frame.

SUMMARY OF THE INVENTION

In accordance with the principles of the invention, the use of stolen MIN-ESN information to fraudulently place wireless calls is prevented by having the MSCs of multiple wireless carriers forward or direct, over a telephone connection, all calls placed from selected MINs to a central authentication platform that serves the multiple wireless carriers. The central authentication platform engages in a so-called "challenge-response" authentication with local processors that are interfaced to (or embedded in) the wireless telephones from which non-fraudulent calls originate. The challenge-response authentication uses a shared secret key (S-Key) that is not broadcast over the air interface, thus preventing the key from being "stolen". A call from a wireless telephone that is not interfaced to a local processor capable of successfully completing the challenge-response authentication is blocked, while a call from a wireless telephone having a local processor capable of successfully completing the challenge-response authentication is completed to the number desired by the customer. Advantageously, since the central authentication platform serves multiple wireless carriers, a) the need for one wireless carrier to access the database of another is alleviated, b) the expense of providing additional security is reduced and c) each wireless carrier need only know the identity of the selected MINs.

In one embodiment, each selected MIN is associated with a special class of service that is recognized by the MSCs of the multiple wireless carriers, so that all call attempts from any wireless telephone having one of the selected MINs, which includes telephones cloned to have such a MIN, are muted to a specific number. The specific number, e.g., an 800-type toll free telephone number, corresponds to the central authentication platform, which performs the challenge-response authentication. In this embodiment, the central authentication platform is part of an interexchange carrier (IXC) network. The central authentication platform blocks fraudulent calls from "cloned" wireless telephones using any of the selected MINs because such wireless telephones are not each connected to a local processor with the proper shared key necessary to successfully complete the challenge-response authentication.

DETAILED DESCRIPTION

Figures 1, 2:
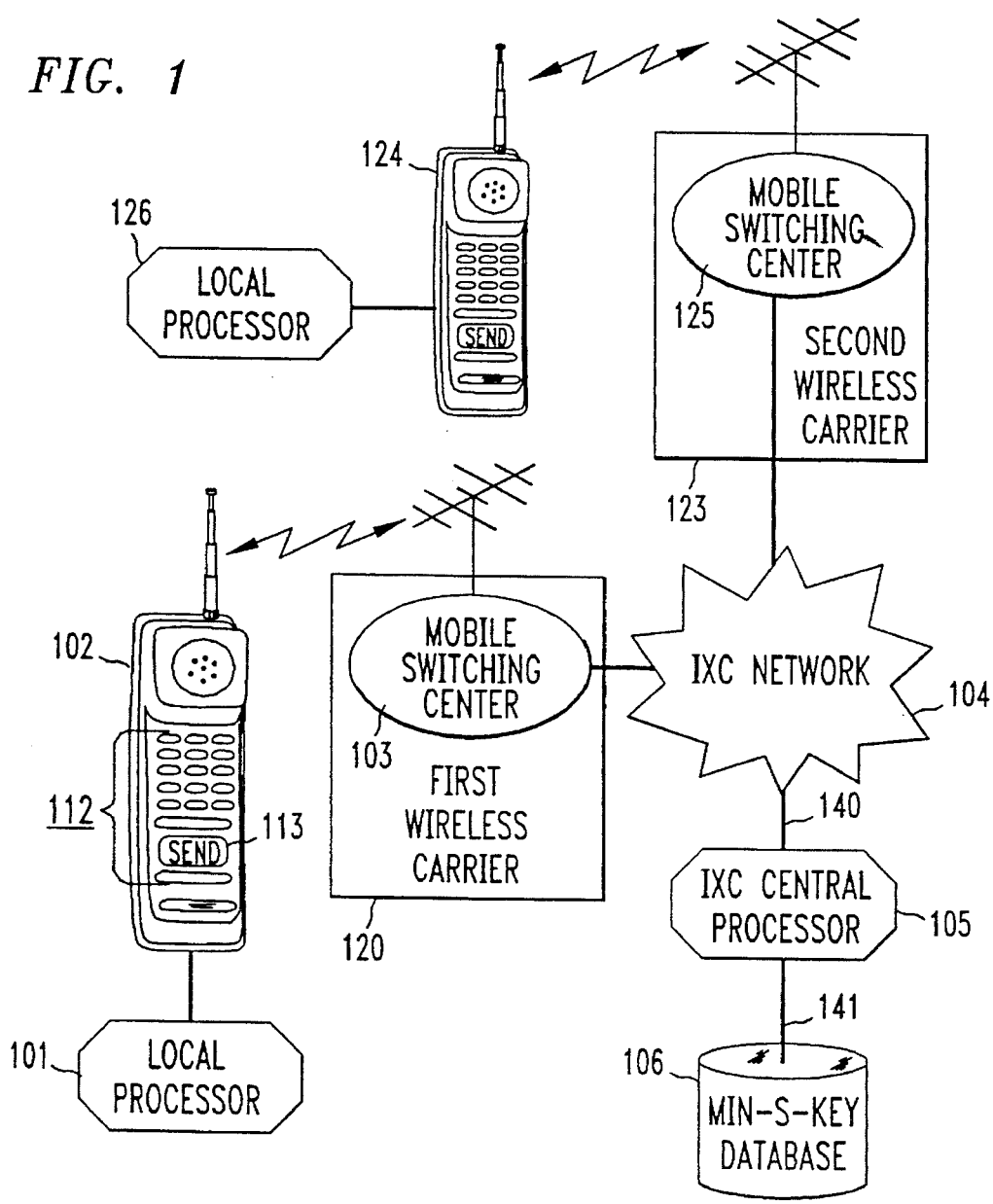
FIG. 1 shows exemplary apparatus for use in processing wireless calls in accordance with the principles of the invention.
FIG. 2 shows an exemplary structure for the MIN - S-Key database, shown in FIG. 1.

FIG. 1 shows exemplary apparatus for use in processing wireless calls in accordance with the principles of the invention. Wireless telephone 102 requests wireless telephone service by accessing mobile switching center (MSC) 103 of first wireless carrier 120. The dialed digits are also transferred to, and stored in, local processor 101.

In response, MSC 103 performs the standard MIN/ESN checks of the prior art MSC 103 also checks the MIN to determine if it has any special class of service associated with it. According to the invention, a group of MINs are defined-by assigning each MIN in the group a particular class of service—so that all calls originated from wireless telephones having a MIN that is a member of the group are directed or forwarded to IXC central processor (ICP) 105.

This is achieved by having MSC 103 direct or forward such calls to single destination specified by a particular telephone number, which is the telephone number of IXC central processor (ICP) 105. For example, the particular telephone number could be an 800-type toll-free telephone number. Such numbers are usually translated by IXC network 104 into an actual destination. The determination of whether a particular MIN belongs to the group can be based on as few as the first 3 but up to all of the digits of the MIN.

If the MIN of wireless telephone 102 belongs to the group, IXC Network 104 mutes the call to ICP 105, in response to the forwarding of MSC 103. MSC 103 also supplies to ICP 105 the MIN it received from wireless telephone 102. ICP 105 looks up the received MIN in MIN - S-Key database 106 and retrieves the unique, corresponding S-Key stored in association therewith. Using the retrieved S-Key, ICP 105 formulates a challenge, for wireless telephone 102. In one embodiment, the challenge, and subsequent response from local processor 101, can be transmitted as a series of dual-tone multi-frequency (DTMF) signals over the voice path connection between ICP 105 and wireless telephone 102 via standard voice path connection between ICP 105 and wireless telephone 102. In an alternative embodiment, the challenge and response information is transmitted over the voice path connection between ICP 105 and wireless telephone 102 via standard modem protocols, e.g. V.32, V.42, Bell 212 etc. It is noted that any challenge-response algorithm may be employed, provided that the S-Key itself is not transmitted over the air interface.

Local Processor (LP) 101 is connected to wireless telephone 102. This connection may be achieved by any of the following methods: a) a direct incorporation of LP 101 into the internal structure of wireless telephone 102, so that it is pan of the telephone's intelligence for call set-up; b) a modem connection between LP 101 and wireless telephone 102; c) connection via a dam pen built-in to wireless telephone 102 and a corresponding dam port on LP 101; or d) placing wireless telephone 102 into an acoustic coupler mounted on LP 101. LP 101 receives the challenge that was transmitted by ICP 105, via its connection to wireless telephone 101, and generates a response, which it causes to be transmitted over its connection to wireless telephone 101 and then to ICP 105.

ICP 105 independently calculates the correct response to the challenge it transmitted and compares this correct response with the response received from LP 101. If a proper response is received, i.e., the received response matches the correct response calculated by ICP 105, ICP 105 requests that LP 101 supply the dialed digits entered by the customer. After receiving the dialed digits, ICP 105 causes completion of the call to the dialed destination via the IXC Network 104.

In one embodiment of the invention, completion of the call is achieved by having ICP 105 supply signals to IXC network 104 instructing it to disconnect the telephone connection from MSC 103 to ICP 105 and to reroute the connection from MSC 103 directly to the destination indicated by the dialed digits. In another embodiment of the invention, completion of the call is achieved by leaving the telephone connection from MSC 103 to ICP 105 intact and having ICP 105 cause a new telephone connection to be extended from itself to the destination indicated by the dialed digits. The telephone connection from MSC 103 to ICP 105 is then bridged to the telephone connection from ICP 105 to the destination indicated by the dialed digits.

Wireless telephone calls placed from wireless telephones in the territory of second wireless carrier 123, e.g., wireless telephone 123, are similarly processed by mobile switching center 125, IXC network 10, ICP 105 and MIN-S-Key database 106. As a result, advantageously, a high degree of security can be achieved without first wireless carrier 120 having to cooperate with second wireless carrier 123 in any way, beyond assuring that any calls from wireless telephones having MINs that were issued by second wireless carrier 123 that are members of the group, such as wireless telephone 123, are forwarded to ICP 105. Therefore, there is no necessity for the wireless carriers to have the ability to access each other's data bases, as is required by prior art solutions, nor is there any need for the wireless carriers to expend the significant funds that would be required to upgrade their switching equipment to be compatible with a new call setup standard. Furthermore, because many currently existing wireless telephones have a data port for use with modems or facsimile machines, they can easily be adapted to connect to a local processor. Also, other existing wireless telephones may be retrofitted with new ROMs that permit them to perform the functions of local processor 101. Thus, local processor 126 can be inside wireless telephone 124.

FIG. 2 shows an exemplary structure for MIN- S-Key database 106. A secret key (S-Key) 201 is stored in association with each MIN 200. Note that, advantageously, the MINs stored in MIN 200 need not be dialable. That is, there is no requirement that the MIN be one that can be dialed via the public switched telephone network (PSTN). This is possible since all calls from wireless telephones having such MINs are always initially forced to terminate at ICP 105 by MSCs of wireless carriers served by ICP 105. The MINs need not be arranged according to the wireless carrier which issued them.

A further advantage of the invention is that additional information pertaining to each particular MIN in the group can be stored in database 106. Such additional information may include 1) restrictions on the destinations to which calls placed from a wireless telephone having this MIN may be completed, as indicated by a list of telephone numbers to which calls may be completed, and 2) blocking telephone calls from wireless telephones having the MIN for reasons other that security, such as non-payment of previously issued telephone bills. In FIG. 2, field BLOCK 202 is a field for controlling the blocking of MINs. Any MIN with a value of YES in the BLOCK 202 field is blocked from making any calls.

Figure 3:
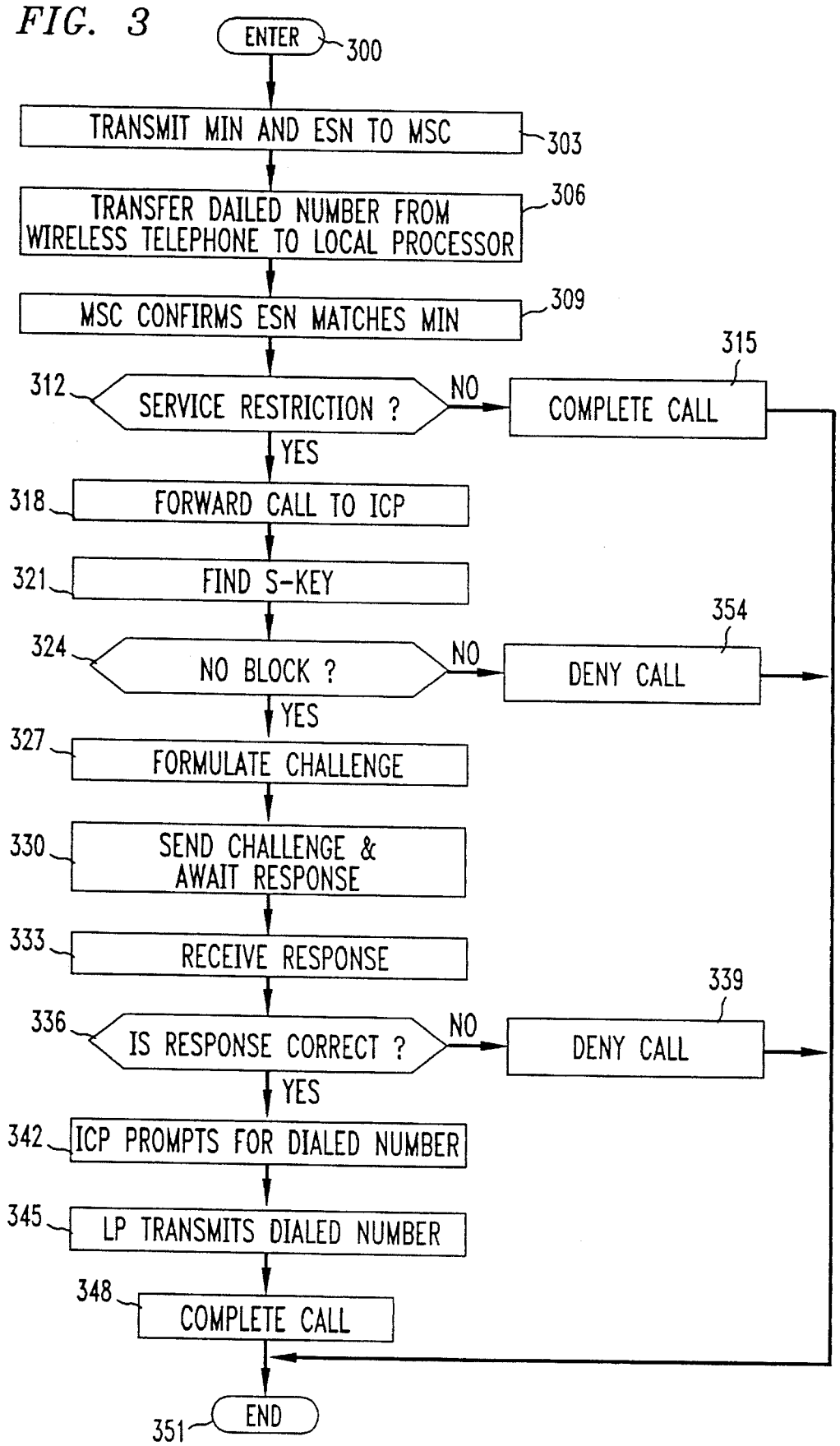
FIG. 3 shows a flow chart of a process for making an authenticated wireless telephone call, in accordance with the principles of the invention.

FIG. 3 shows a flow chart of an exemplary process for making authenticated wireless telephone calls, in accordance with the principles of the invention. The process is entered, in step 300, when a caller at wireless telephone 102 (FIG. 1)enters the called number on keypad 112 (FIG. 1) and presses SEND key 113. Wireless telephone 102 transmits the MIN and ESN to MSC 103 in step 303. In step 306, the dialed number is transferred from wireless telephone 102 to LP 101 via the data link between them. LP 101 stores the dialed number for later use, described hereinbelow. Next, in step 309, MSC 103 confirms that the ESN it received is the one associated with the MIN it received, as in the prior art.

Conditional branch point 312 (FIG. 3) tests to determine if there is a class of service restriction associated with the received MIN that requires the sending to ICP 105 of all calls originating from that MIN, i.e., is the MIN a member of the group of MINs for which all calls originated by wireless telephones having a group member MIN must be sent to ICP 105. If the test result in step 312 is NO, control passes to step 315, in which the call is completed as in the prior art. The process is then exited via step 351. If the test result in step 312 is YES, indicating that the received MIN is a member of the group, control passes to step 318, in which the call is forwarded or directed by MSC 103 to ICP 105, via IXC Network 104.

Next, in step 321, ICP 105 finds, if there is one, the value in S-Key 201 (FIG. 2) that is stored in MIN - S-Key database 106 in association with the value of the MIN received from wireless telephone 102. Next, conditional branch point 324 tests to determine if a value was found in S-Key 201 associated with the received MIN, and also if there is a NO value in BLOCK 202 associated with the received MIN. If the test result in step 324 is NO, i.e., no value was found stored in S-Key 201 of MIN - S-Key database 106 for the received MIN or there is a YES value in BLOCK 202, control passes to step 354, in which the call is denied. The process is then exited via step 351. If the test result in step 324 is YES, i.e., if a value is found stored in S-Key 201 in association with the received MIN and there is a NO value in BLOCK 202, control passes to step 327, in which ICP 105 formulates a challenge based on the value stored in S-Key 201, that was found in step 321.

In step 330, the challenge is transmitted over the voice path to LP 101 and ICP 105 calculates the correct response to the challenge while awaiting the response from LP 101. The response is received by ICP 105 from LP 101 in step 333. If a response is not received within a predetermined time, a time-out may occur and the call is denied. Conditional branch point 336 tests to determine if the response received from the LP 101 matches the correct response calculated by ICP 105. If the test result in step 336 is NO, control passes to step 339, in which the call is denied. The process is then exited via step 351. If the test result in step 336 is YES, control passes to step 342.

In step 342, ICP 105 prompts the LP 101 for the number dialed by the caller. As noted above, the dialed number was transferred from wireless telephone 102 to LP 101 via the data link between them when the caller pressed the SEND key in step 306. LP 101 transmits the called number to ICP 105 in step 345. Next, in step 348, ICP 105 completes the call to the dialed number via IXC network 104. The process is then exited via step 351.

Figure 4:
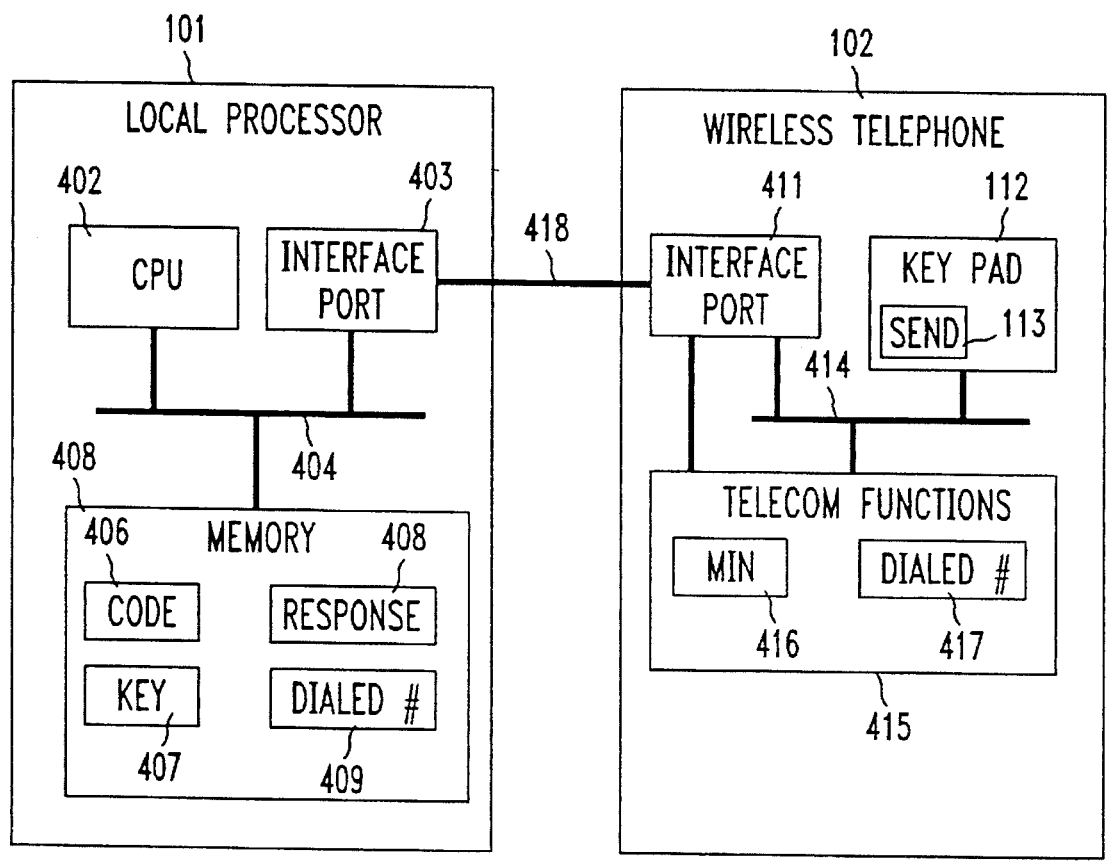
FIG. 4 is a block diagram view of an exemplary embodiment of the local processor and wireless telephone shown in FIG. 1.

FIG. 4 is a block diagram view of an exemplary embodiment of LP 101 (FIG. 1) and its interconnection with wireless telephone 102. LP 101 is comprised of a) central processing unit (CPU) 402, b) data bus 404, c) interface port 403 and d) memory 405. Central processing unit (CPU) 402 provides all the computational capability necessary to control all the processes of LP 101. Data bus 404 provides for the exchange of data between the components of LP 101. Interface port 403 provides for the exchange of data between LP 401 and devices external to LP 101, such as wireless telephone 102, over link 418. To this end, interface port 403 may contain dual tone, multi-frequency (DTMF) transmitters and receivers, as well as data transceivers. Link 418 may contain a data path, a voice path or both. Memory 405 includes 1) code portion 406, which contains the instructions (program) used by CPU 402 to control the processes of LP 101; 2) key storage 407, in which is stored the S-Key for LP 101 that is associated with the MIN of wireless telephone 102; 3) response 408, in which is temporarily stored the response generated by CPU 402 after receipt of a particular challenge from ICP 105; and 5) dialed #409 in which LP 102 stores the number dialed by the caller that it received from wireless telephone 102 over link 418

Wireless telephone 102 is essentially conventional, and typically includes, a) interface port 411, b) key pad 12, c) data bus 414, and d) telecommunication functions 415. Interface port 411 is used by wireless telephone 102 to communicate with devices external to wireless telephone 102, such as local processor 101. Interface port 411 may contain a data interface, connection to the voice path of wireless telephone 102 or both. Key pad 112, is used by the caller to enter into wireless telephone 102 the information for placing wireless telephone calls, as in the prior art. In particular, the caller presses send key 113 to initiate a wireless telephone call after having entered the called telephone number. The exchange of data between all the components of wireless telephone 410 is achieved by transferring information over data bus 414. Telecommunication function 415 represents all the components of the wireless telephone 410 required to perform wireless telecommunications as in the prior art. Stored within telecommunication functions 415 are a) MIN 416, which is the MIN associated with wireless telephone 410 and b) dialed #417, in which is stored the number dialed by the caller.

Figure 5:
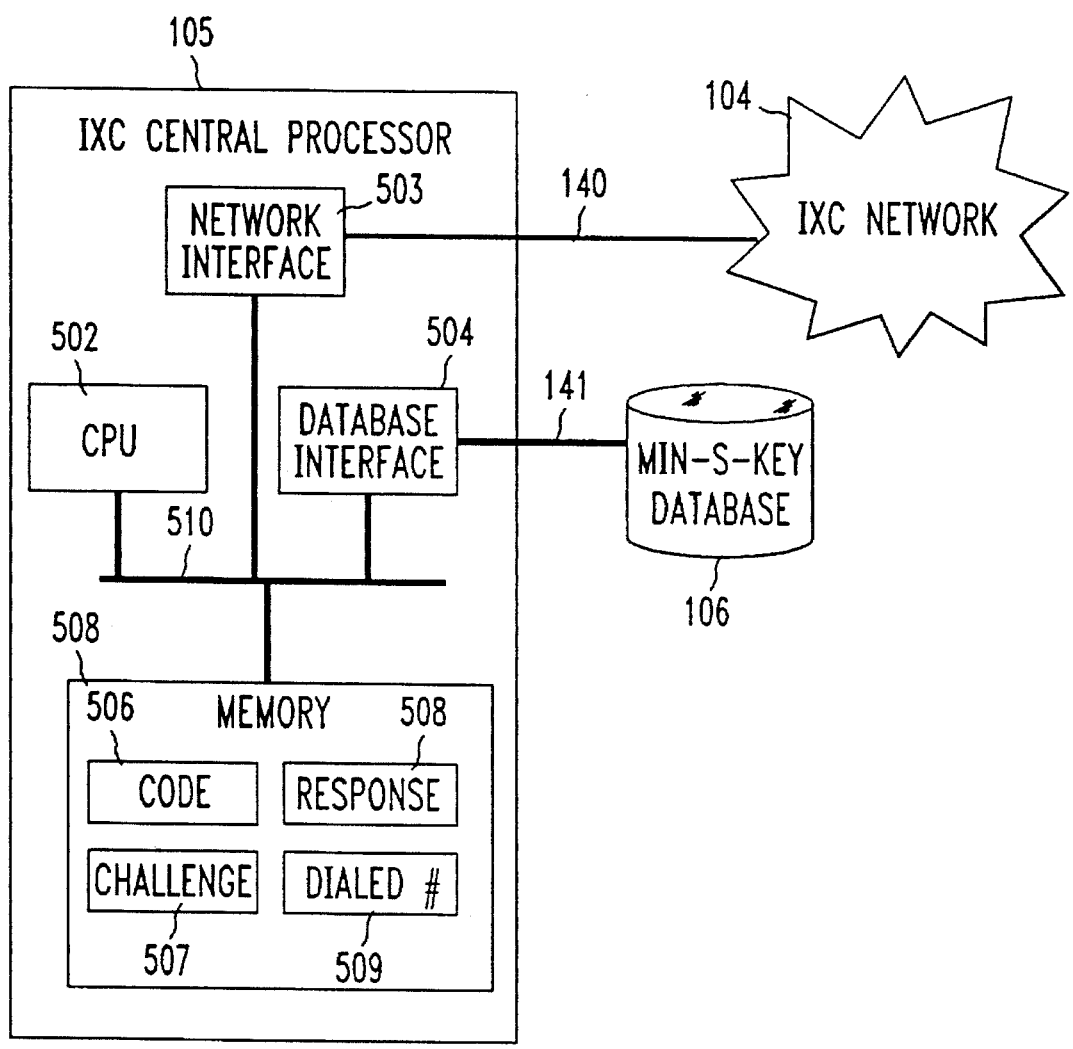
FIG. 5 shows, in block diagram form, an exemplary embodiment of an IXC central processor (ICP) shown in FIG. 1.

FIG. 5 shows, in block diagram form, an exemplary embodiment of IXC central processor (ICP) 105 (FIG. 1) as well as its interconnections to IXC network 104 and MIN - S-Key database 106. ICP 105, which is similar to local processor 101 in some respects, but can handle, simultaneously, many calls from multiple wireless carriers, includes a) central processing unit (CPU) 502, b) data bus 510, c) memory 505, d) network interface port 503, and e) database interface port 504. Central processing unit (CPU) 502 provides all the computational capability necessary to control all the processes of ICP 105. Data bus 510 provides for the exchange of data between the components of ICP 105. Memory 505 includes 1) code portion 506, which contains the instructions (program) used by CPU 502 to control the processes of IXC central processor 105; b) challenge 507, in which is stored the challenge that is generated for authenticating a wireless telephone; c) response 508, in which is stored the response generated by CPU 502 for comparison with value received from in response to the value stored in challenge 507; and d) dialed #509, in which is stored the number dialed by the caller, sent by wireless telephone 102 (FIG. 1).

Network interface port 503 facilitates the exchange of signals between ICP 105 and IXC Network 104. To this end, interface port 403 may contain dual tone, multi-frequency (DTMF) transmitters and receivers, as well as data transceivers. Link 140 is the connection between ICP 105 and IXC network 104 that is used for the exchange of signals between ICP 105 and wireless telephone 102 (FIG. 1). Link 140 may include a data path, a voice path or both. Database interface port 504 is the interface between ICP 105 and IXC MIN - S-Key database 106. Link 141 is the connection between ICP 105 and IXC MIN - S-Key database 106 used for the exchange of data between ICP 105 and IXC MIN - S-Key database 106.

In some embodiments, ICP 105 may be arranged in a distributed and duplicative manner, according to principles well known in the an for distributed computing systems, to improve processing time and reliability.

The foregoing merely illustrates the principles of the invention. It will thus be appreciated that those skilled in the an will be able to devise various arrangements which, although not explicitly described or shown herein, embody the principles of the invention and are thus within its spirit and scope.

We claim:

1. A method for use in completing calls from first and second wireless telephones each having a MIN, said wireless telephones being served by respective first and second wireless carriers, the method comprising the steps of:

receiving at first and second mobile switching centers belonging, respectively, to said first and second wireless carriers, requests for completion of a wireless call from each of said wireless telephones;

establishing with an authentication platform, from each of said first and second mobile switching centers, respective first and second voice channel telephone connections, said authentication platform serving said first and second wireless carriers, if said first and second requests originated from wireless telephones belonging to a group of predetermined MINs;

supplying to said authentication platform said MINs of said first and second wireless telephones, said MIN of said first wireless telephone being supplied over said first telephone connection and said MIN of said second wireless telephone being supplied over said second telephone connection;

transmitting respective challenges from said authentication platform to each of said first and second wireless telephones, via said first and second telephone connections and said first and second mobile switching centers of said first and second wireless carriers, each of said challenges being developed by said authentication platform from respective secret keys stored therein in association with said respective MINs of said first and second wireless telephones; and denying, by said authentication platform, said first or said second call requests for which a proper response to its respective challenge is not received.

2. A method for use in completing calls from wireless telephones, each wireless telephone being served by one of a plurality of wireless carriers, the method comprising the steps of:

receiving requests at mobile switching centers of said plurality of wireless carriers for completion of calls from said wireless telephones;

forwarding over voice paths, from said mobile switching centers to an authentication platform serving said plurality of wireless carriers, those of said calls originated from wireless telephones having MINs that belong to a particular predefined group of MINs;

transmitting a challenge from said authentication platform to each of said wireless telephones via, said mobile switching centers of said plurality of wireless carriers; and blocking those of said calls for which a proper response to said challenge is not received.

3. The invention as defined in claim 2 wherein responses to said challenges are supplied by local processors connected to said wireless telephones.

4. The invention as defined in claim 3 wherein said local processors are external to said wireless telephones.

5. The invention as defined in claim 2 wherein said challenges are transmitted over voice path connections between said wireless telephones and said authentication platform.

6. The invention as defined in claim 2 wherein at least one of said particular predefined group of MINs is a non-dialable MIN.

7. The invention as defined in claim 2 wherein, in said forwarding step, said calls are forwarded by said mobile switching centers to said authentication platform by being routed to a particular telephone number.

8. The invention as defined in claim 7 wherein said particular telephone number is one that requires translation for said routing to successfully complete.

9. The invention as defined in claim 2 wherein, for at least one of said calls, a proper response to said challenge is received and further including the steps of:

blocking said at least one call if information stored in said authentication platform for said MIN for said at least one call indicates that said at least one call is not to be completed.

10. The invention as defined in claim 2 further including the steps of:

receiving at said authentication platform responses to said challenges;

receiving at said authentication platform telephone numbers to which said calls are to be completed; and completing said calls for which said received responses are proper responses to said respective ones of said telephone numbers received for said calls.

11. The invention as defined in claim 10 further including the step of:

responsive to receipt of said responses, transmitting prompts requesting said telephone numbers to which said calls are to be completed.

12. An authentication platform for use in routing calls from wireless telephones, comprising:

means for receiving a request from one of a plurality of wireless carriers for completion of a call from a wireless telephone having a particular MIN, said request including said particular MIN and having been forwarded to said authentication platform over a voice path by said one of said plurality of wireless carriers because said particular MIN belongs to a predefined group of MINs;

means responsive to said particular MIN for generating and transmitting a challenge to said wireless telephone via said one of said plurality of wireless carriers;

means for determining a correct response to said challenge;

means for receiving a response to said challenge; and means for blocking said call if a response to said challenge matching said correct response is not received.

13. The invention as defined in claim 12 wherein said means for generating and transmitting generates said challenge using a secret key that (i) is unique to said particular MIN and (ii) is not transmitted by said means for generating and transmitting.

14. The invention as defined in claim 12 wherein said means for receiving receives said response from a voice path connection between said wireless telephone and said authentication platform.

15. The invention as defined in claim 12 wherein said means for generating and transmitting transmits said challenge over a voice path connection between said wireless telephone and said authentication platform.

\* \* \* \* \*